United States Patent
Langguth et al.

(10) Patent No.: US 6,975,058 B2
(45) Date of Patent: Dec. 13, 2005

(54) COMMUTATOR ARRANGEMENT FOR A SMALL ELECTRIC MOTOR

(75) Inventors: Jochen Langguth, Pretzfeld (DE);
Kathrin Langguth, Pretzfeld (DE);
Valerij Korsuchin, Fürth/Bay (DE);
Michael Sax, Aachen (DE)

(73) Assignee: Sintertechnik GmbH, Pretzfeld (DE)

( * ) Notice: Subject to any disclaimer, the term of this patent is extended or adjusted under 35 U.S.C. 154(b) by 14 days.

(21) Appl. No.: 10/802,247

(22) Filed: Mar. 17, 2004

(65) Prior Publication Data

US 2005/0206269 A1    Sep. 22, 2005

(51) Int. Cl.⁷ .................. H01R 39/00; H01R 39/46
(52) U.S. Cl. ................. 310/233; 310/237; 310/40 MM
(58) Field of Search ............... 310/233, 235, 310/237, 40 MM

(56) References Cited

U.S. PATENT DOCUMENTS

| 3,521,101 A | * | 7/1970 | Arora | 310/233 |
| 4,533,848 A | * | 8/1985 | Nakamura | 310/237 |
| 6,144,133 A | | 11/2000 | Steffan et al. | |

FOREIGN PATENT DOCUMENTS

| DE | 2 336 643 | | 1/1974 | |
| EP | 0 551 740 A1 | | 7/1993 | |
| EP | 1071191 | * | 4/2000 | .......... H02K 11/02 |
| JP | 6-169558 | | 6/1994 | |
| JP | 2001-061260 | * | 6/2005 | .......... H02K 13/00 |
| SU | 1700665 A1 | | 12/1991 | |

* cited by examiner

*Primary Examiner*—Burton Mullins
(74) *Attorney, Agent, or Firm*—Rankin, Hill, Porter & Clark LLP

(57) ABSTRACT

A commutator arrangement for a small electric motor with a capacitor ring disk having several capacitor elements, wherein the capacitor ring disk is made of a dielectric first ring disk (RS) on whose upper side several sector-shaped electrode layers (6) are placed. Each of the electrode layers (6) are electrically conductively connected with a commutator segment (13). Counter electrodes of the capacitor elements are provided on an under side opposite the upper side. To improve the interference suppression features a single counter electrode layer (4), which underlies almost the entire surface of the electrode layer (6), is provided on the under side so that the counter electrodes of all capacitor elements have the same potential.

18 Claims, 7 Drawing Sheets

COMMUTATOR ARRANGEMENT FOR A SMALL ELECTRIC MOTOR

Figure 1:
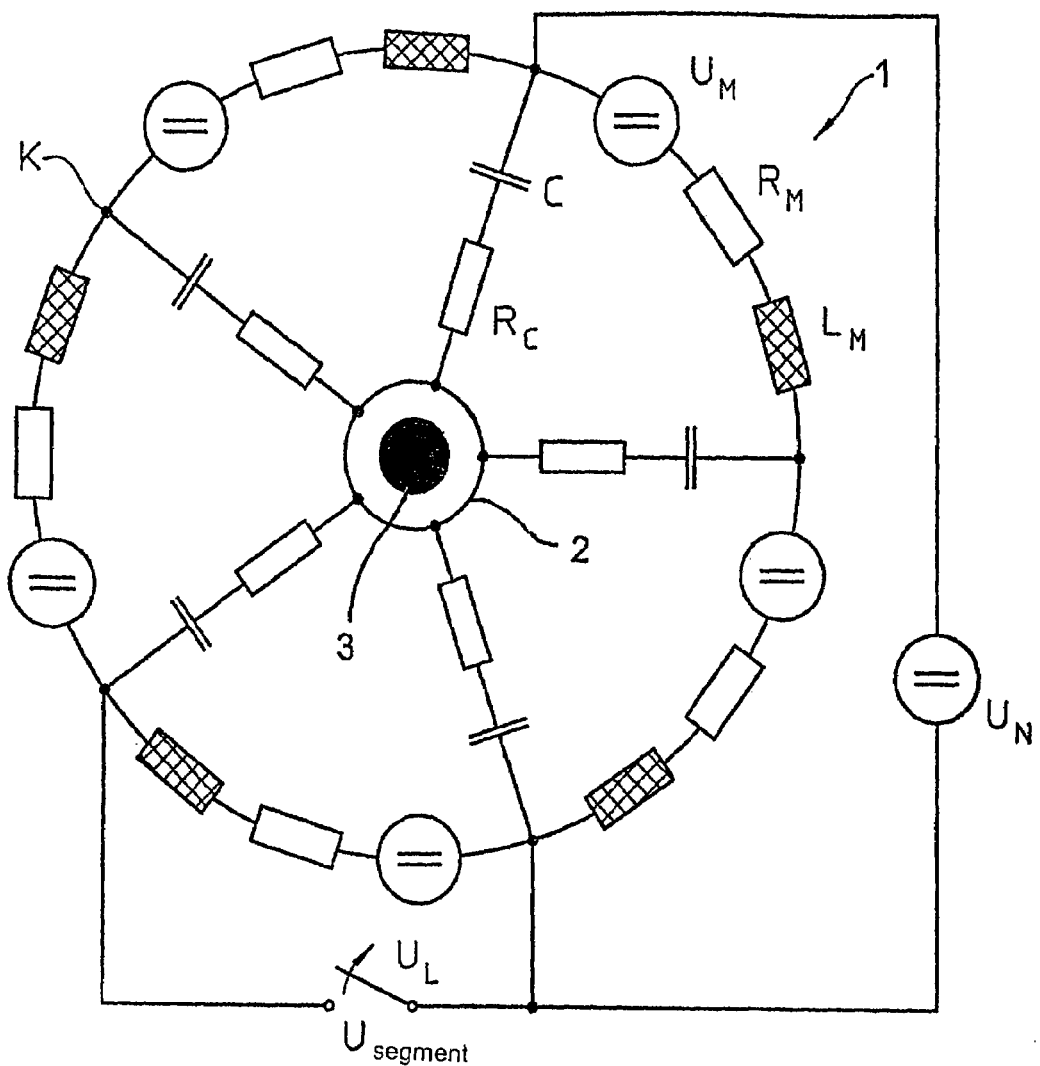

The invention relates to a commutator arrangement for a small electric motor in accordance with the preamble of claim 1.

With small electric motors, in particular with direct current motors, the current is fed in via sliding contacts. The sliding contacts are made, for example, of brushes of carbon or precious metal which press against commutator segments located on a commutator sleeve. When commutation occurs, sparks are created. Such sparking is not desired. It causes erosion of the sliding contacts in particular as well as the emission of electromagnetic interference.

From DE 199 34 685 A1 it is known to provide a ring disk with capacitive features to suppress sparking. This so-called capacitor or CLL disk is made of semi-conducting ceramic whose surface has a barrier layer. A contact surface is provided on the barrier layer for each partial winding or for each collector segment. The size of the contact surface defines a capacitance. The contact surface is electrically conductively connected with the commutator segment assigned to it. The interior of the ceramic is usually n or p semi-conducting and is separated from the exterior contact surfaces with an insulating barrier layer. Through the thickness d of the barrier layer the capacitance of the individual contact surfaces is determined in accordance with $C=\epsilon_0 \epsilon_r A/d$. Charge equalization can take place continuously inside the ceramic due to the semi-conducting features.

The known CLL disks in accordance with the state of technology are not particularly strong mechanically. They must have a relatively large thickness of approximately 1.0 to 1.5 mm. Usually a plastic supporting disk molded onto the shaft of the small electric motor is provided to hold such a CLL disk. This further increases the thickness of the commutator disk arrangement to approximately 2.5 to 3.5 mm. In particular with motors with iron-free winding such as bell winding motors, the length of the permanent magnet must be limited accordingly or the entire length of the motor must be increased. The capacitance potential of the small electric motor can not be fully utilized. After all, the known CLL disks are restricted in their capacitance. Furthermore the capacitance and the series resistance of the capacitance cannot be set separately from each other. With certain applications or operating modes undesired sparking cannot be sufficiently suppressed.

On the subject of increasing the capacitance it is furthermore known from DE 199 34 685 A1 that discrete capacitor elements are installed as SMD components via SMD technology on a supporting disk made of printed circuit material. The capacitor elements are connected one after another, in series, between two adjacent commutator segments, similar to the CLL disk. The suggested commutator segment is also relatively thick. Its manufacturing is time-consuming and expensive.

From DE-OS 1 938 229 an interference suppression device is known for mini electric motors. With this the interference suppression capacitors consist of barrier layer capacitors shaped in the form of a ring disk.

EP 0 551 740 B1 of this type describes a mini electric motor on which the capacitors are also shaped in the form of a ring disk. The ring disk contains several multi-layer capacitors here which are connected together in series. The capacitors are also switched in parallel to the inductivities created by the motor winding.

The object of the invention is to specify an alternate commutator for small electric motors which ensures reliable suppression of sparking.

This object is solved by the features of claim 1. Useful embodiments result from the features of claims 2 to 18.

According to the invention it is provided that a single counter electrode layer which underlies almost the entire surface of the electrode layer on the underside so that the counter electrodes of all capacitor elements are on the same potential. This permits in an advantageous way charge equalization to take place continuously between the counter electrodes. The buildup of undesired charge differences of the capacitor elements cannot occur. The capacitances and their series resistances are decoupled from each other and thus can be set as desired. Particularly effective, steady and reliable sparking suppression is ensured.

A "capacitor element" consists of an electrode and a counter electrode which are separated from each other by a dielectric layer. According to the subject of the invention the dielectric layer is created by a first ring disk. The term "counter electrode" is used to mean a section of the first ring disk located on the under side which is located opposite an electrode layer provided on the top side. The electrode layer is located on the electrode. This is an electrically conductive layer which can be contacted. The counter electrode layer is also an electrically conductive layer which can also be contacted. The term "capacitor ring disk" is used to mean a first ring disk which has several electrode layers on the top and a counter electrode layer on the bottom.

In accordance with an advantageous embodiment it is provided that a plurality of capacitor ring disks are laminated on top of one another with intermediate placement of one dielectric layer each like a multi-layer capacitor. This is a simple way to implement several parallel-connected capacitor elements per commutator segment which will now be called "capacitive element." Such capacitive elements permit the provision of particularly high capacitances.

With n capacitor ring disks placed one above the other, n capacitances in parallel connection can be created between two adjacent commutator segments. This achieves particularly high capacitances with a clearly reduced thickness of the commutator disk. Stacking the capacitor ring disks makes it possible to simply manufacture parallel connected capacitor elements in a particularly compact form. As is known, the following relationship applies to the parallel connection of capacitors:

$$C_{Ges.}=C_1+C_2+ \ldots +C_n$$

Even with capacitor elements with a low capacitance, high capacitances can be achieved in parallel connection.

The dielectric material is a conventional dielectric material for the manufacture of multi-layer capacitors such as a ceramic made of barium titanate, strontium titanate or other capacitor ceramics with high dielectricity constant and dielectric strength.

It is advantageous that the capacitor elements created by the layers of electrodes located on top of each other for the formation of a capacitive element are contacted and each connected with a commutator segment. With this the capacitor ring disks are advantageously laminated on top of each other so that the electrode layers are essentially located congruently on top of each other. This simplifies their contacting. The electrode layers positioned on top of one another can be contacted together on an exterior circumferential surface of the first ring disks.

In accordance with a further embodiment it is provided that the counter electrode layer is round and extends up to an interior circumference of the first ring disk. With a multi-layer construction this also permits the counter electrode layers to contact each other so that all counter electrode layers are on the same potential.

An electrical connection between the ring layers located on top of each other can be established either by a plated-through connection penetrating the ring disk(s) or by an electrical connection over the exterior and/or interior circumference. It is useful that the electrical connection over the exterior circumference can be located in the recesses provided there. This ensures protection from physical damage.

The electrode and counter electrode layers, plated-through connections and/or electrically conductive connections over the exterior and/or interior circumference can for example be established by the application of electrically conductive pastes and subsequent burning. However they can also be made of conductive paste, conductive adhesive and similar for example.

In accordance with a further embodiment it is provided that the counter electrode layer is formed as a resistance layer with a resistance in the range from 0.1 Ω to 1 kΩ. This makes it simple to implement a simple RC interference suppression circuit.

Furthermore at least one inductor can also be connected before and after the capacitor elements or capacitive elements connected in series. A single inductor can also be provided. However it is also possible to connect at least one discrete inductor before or after each capacitor element or each capacitive element connected in series. The discrete inductors can also be connected in parallel to the capacitor elements.—A second ring disk made from a highly permeable magnet material can be provided with which each of the inductors is formed by a conductive structure located there and wherein the capacitor elements or capacitive elements are each electrically-conductively connected with one of the inductors. Furthermore it is possible that at least one resistance is connected before or after each capacitor element or each capacitive element connected in series. With the resistance this can be a resistance with a linear U/I characteristic curve. However it can also be that the resistance has a non linear U/I characteristic curve. The resistances can be designed in one piece in the form of a third ring disk or in the form of a further resistance layer. The resistance layer can for example be printed on one of the ring disks or on the electrode layers or on the counter electrode layer.

The third ring disk can for example be made of an electro-ceramic material with varistor properties. Such a material permits the diversion of voltage peaks and thus protects components which are used to control the small electric motor. Suitable materials are known electro-ceramic compositions (for example based on doped mixed titanates from the elements of IInd main group or doped $SrTiO_3$ or doped ZnO).

The second and/or third ring disk or resistance layer can form a laminate with the first capacitor ring disk(s).

Furthermore a supporting disk made of ceramic can be provided to retain the capacitor ring disk or the laminate. This increases the mechanical strength of the suggested commutator arrangement. It is useful that the supporting disk is made of a ceramic which is mechanically particularly strong. For instance it can be made of steatite, cordierite, electro porcelain, oxide-ceramic materials, for example $ZrO_2$ which may be stabilized with MgO, CaO, $CeO_2$ or $Y_2O_3$, or $Al_2O_3$, or very strong electro ceramics or for example SiC, $Si_3N_4$, dispersion ceramics and similar.

It is useful that a diameter of a central breakthrough of the ring disks is a maximum of twice the size of a diameter of a shaft of the small electric motor. The ring disks in their installed state thus extend up to the immediate vicinity of the shaft. Usually the diameter of the breakthrough is selected to be only a few $\frac{1}{10}$ths of a mm larger than the diameter of the shaft. In turning away from the state of technology a ring gap between the ring disk and the shaft remaining up to now is filled with the particular ceramic material. This produces an increase in capacitance due to the gain in area in accordance with the relationship $C=\epsilon_0\, \epsilon_r\, A/d$. The characteristics of the commutator arrangement can thus be improved or supplemented in this way.

In accordance with a further advantageous embodiment it is provided that the capacitor ring disk(s) or the laminate is connected with a commutator sleeve supporting the commutator segments. The commutator sleeve can for example be mounted on the capacitor ring disk(s) or the laminate. However it can also be that the capacitor ring disk or the laminate is designed in the form of a hollow cylinder. In this case the commutator segments can surround the capacitor ring disk(s) or the laminate. In this case the suggested interference suppression device is thus located within the commutator. It must be remembered that the capacitor ring disk(s) or the laminate and the commutator segments are connected with each other in such a way that differences in the thermal expansion coefficients can be offset. This arrangement is particularly space-saving.

The ring disks can also be arranged on top of each other in any order even when different electrical characteristics are present. The arrangement particularly depends on the number and type of ring disks which are used. It is also possible to place several ring disks within one level inside each other: A ring disk with a relatively small exterior diameter can be placed in the hole of a ring disk whose hole diameter is somewhat larger than the exterior diameter of the small ring disk.

A top upper side of a ring disk facing in the direction of the commutator sleeve can be covered with an electrically insulated layer. It is useful that a contact section extending from each of the contact segments protrudes into a recess provided on the top upper side of a ring disk and is connected with one of the electrode layers. The aforementioned features are used to prevent short circuits. The thickness of the commutator arrangement can be reduced.

In accordance with a further advantageous embodiment feature it is provided that the ring disks are connected via a layer made of a polymer, preferably a plastic membrane or metal. In particular the suggested sandwich structure, consisting of "brittle" ceramic ring disks and comparably elastic polymer layers in between, contributes to a significant increase of the mechanical strength of the suggested commutator disk. Any existing difference in thermal expansion coefficients of the ring disks can be offset by providing an intermediate layer made of a polymer. The polymer can be a suitable adhesive, a two-sided adhesive plastic membrane, silicone or similar.

With small electric motors with high capacitance and high torque a metallic sleeve for example can be provided on the shaft to establish a sufficient friction-locked connection of the collector plate with the shaft. For example the sleeve can be shrunk on, glued or soldered to the shaft. The commutator disk can then be friction-locked connected with the sleeve. For example the commutator disk can be shrunk on the sleeve or soldered to the sleeve or glued. Due to the enlarged circumferential surface provided by the sleeve a particularly firm connection of the commutator disk with the shaft can be achieved.

The commutator arrangement provided by the invention can be used just as well with iron core motors with small electric motors with bell winding.

In accordance with a further embodiment feature a contact section of the ring disk(s) is connected or the counter electrode layers extending up to the interior circumference are electrically conductively connected with the shaft made of an electrically conductive material. It is useful that the shaft is made of metal. However the shaft can also be made of an insulating material such as ceramics. The electrically conductive connection can be established for example by a solder, conductive adhesive or conductive silver.

Furthermore the invention relates to a small electric motor with a shaft and a commutator arrangement provided by the invention mounted thereon.

Figure 2:
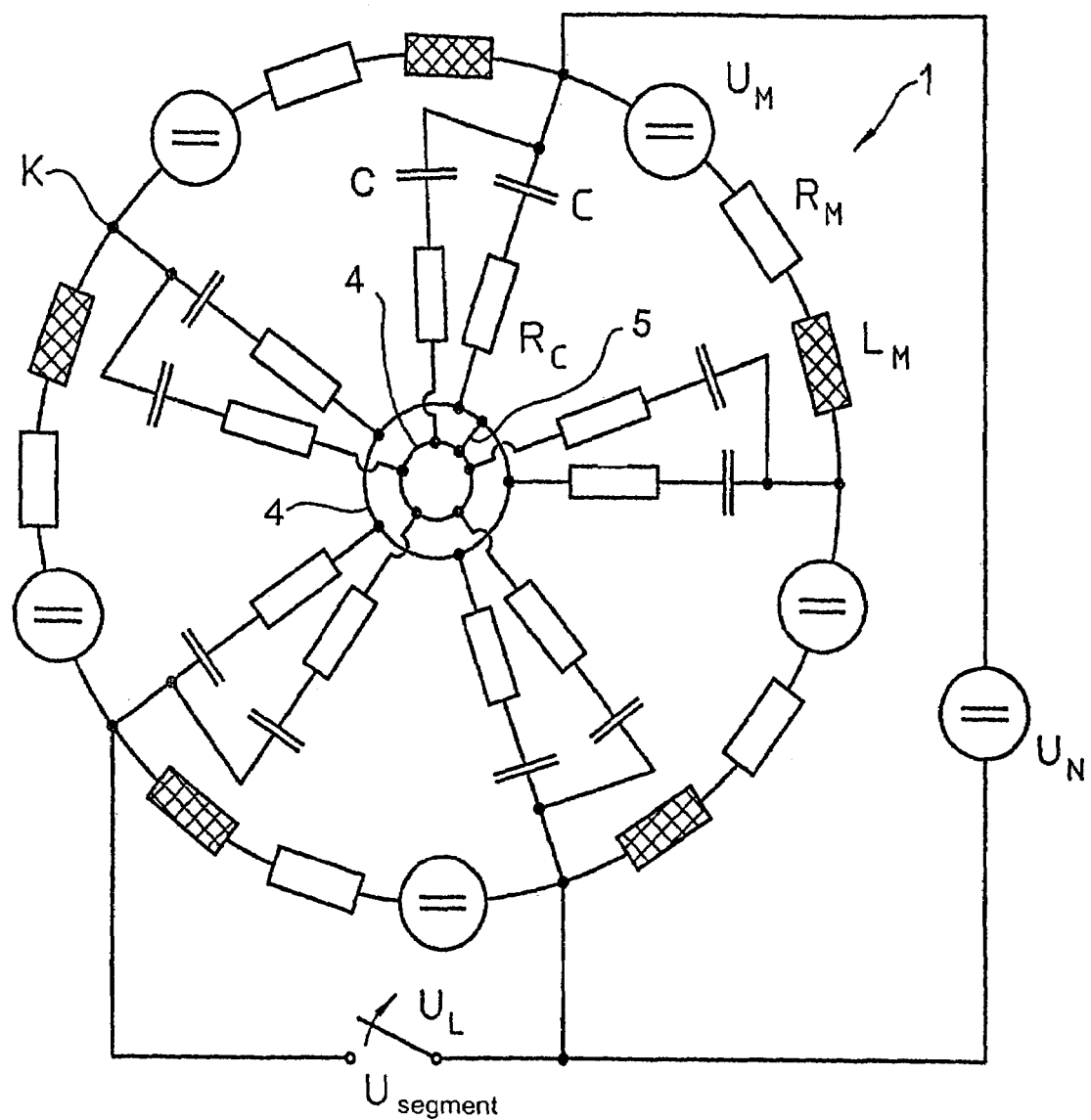
Figure 3:
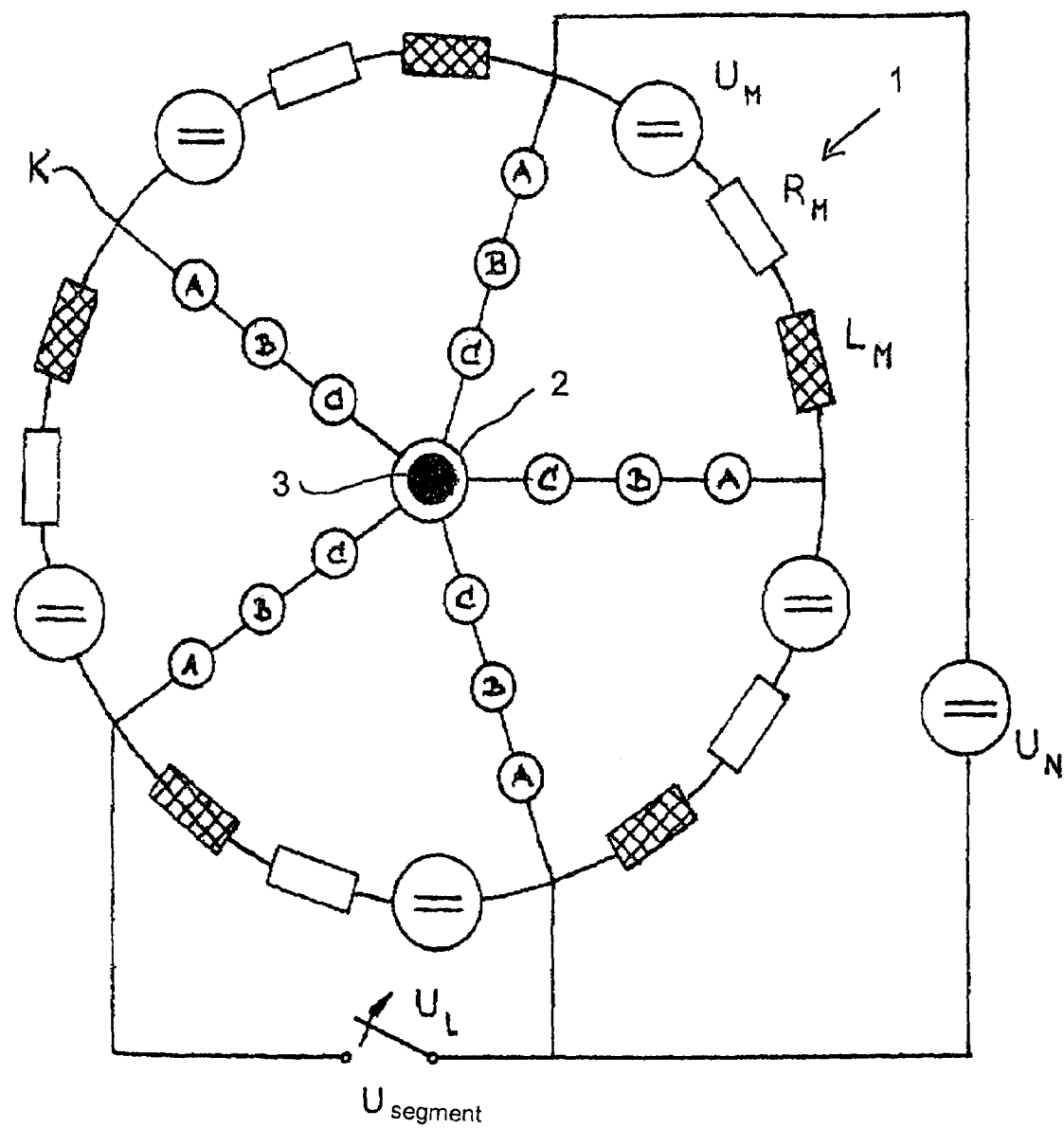
Figure 4:
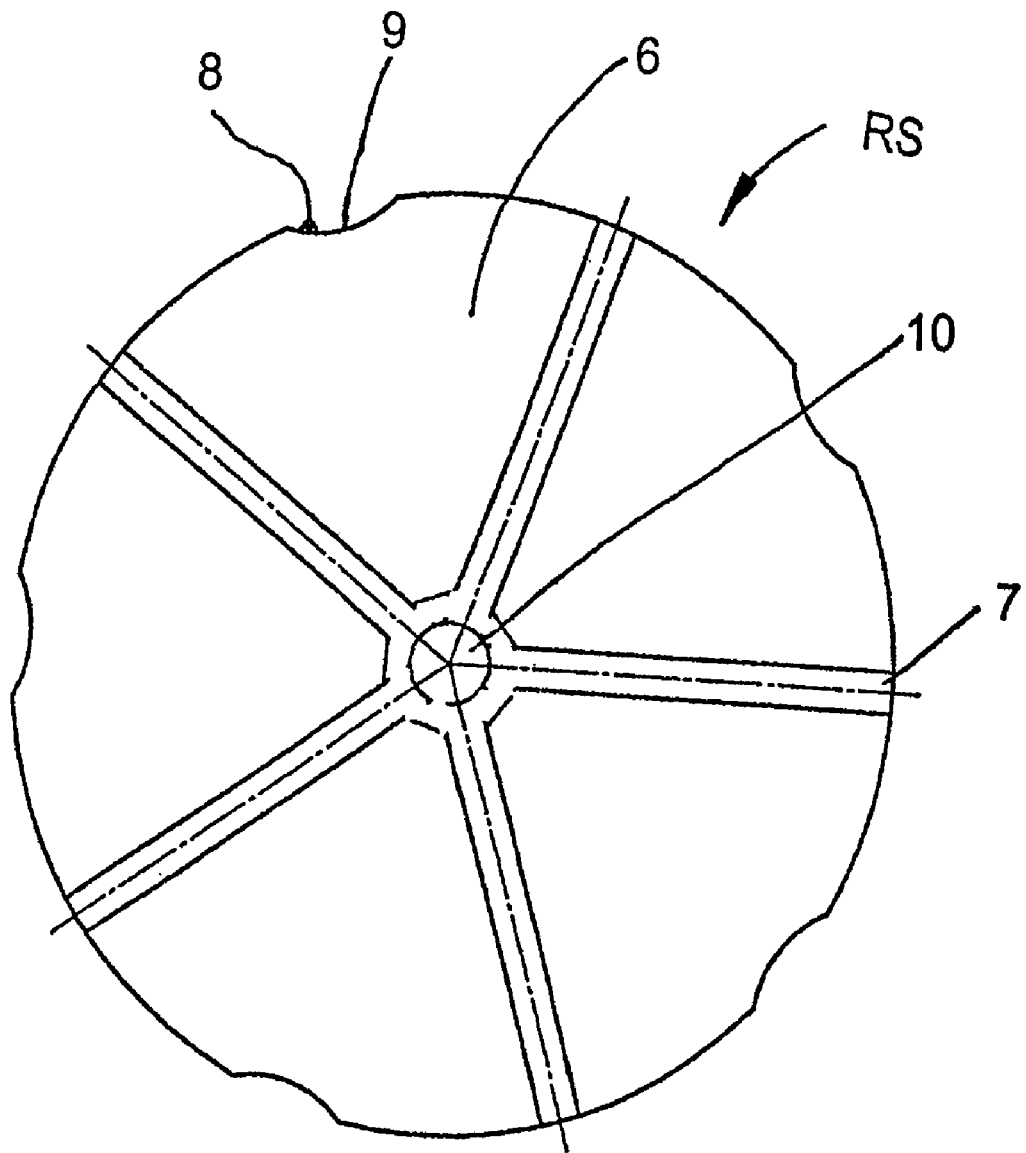
Figure 5:
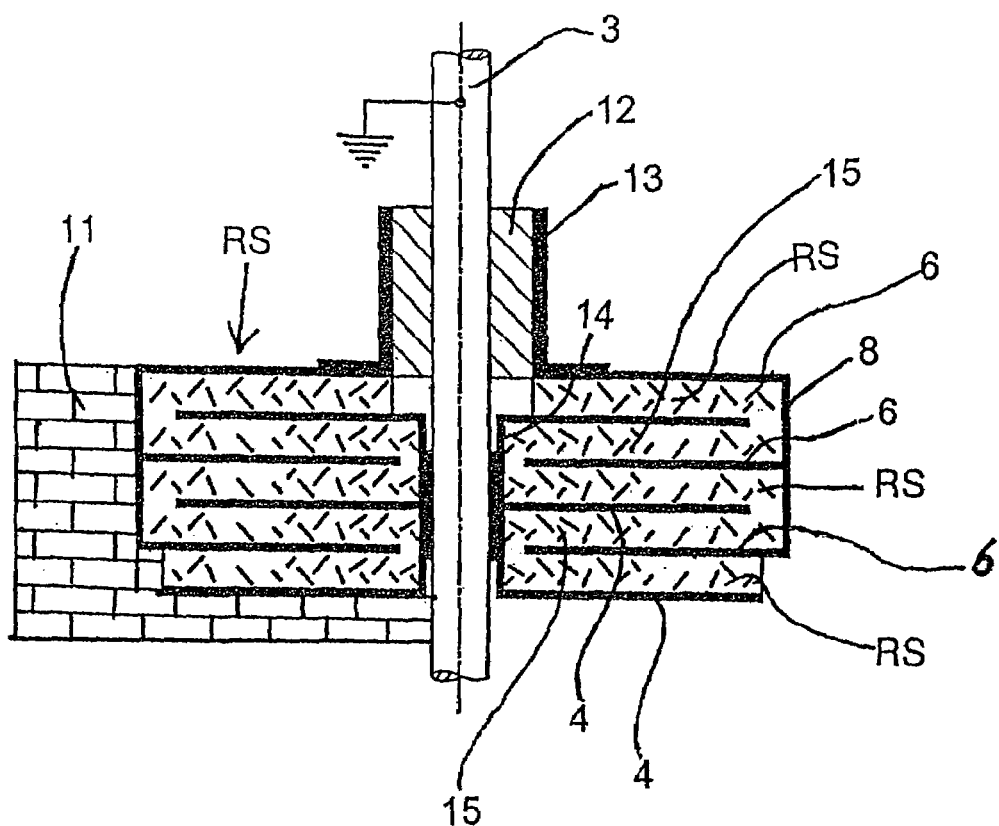
Figure 6A:
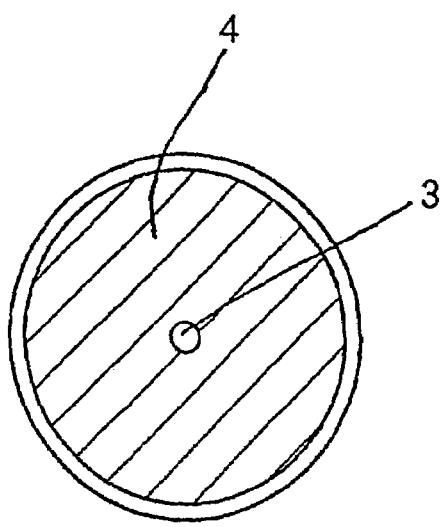
Figure 6B:
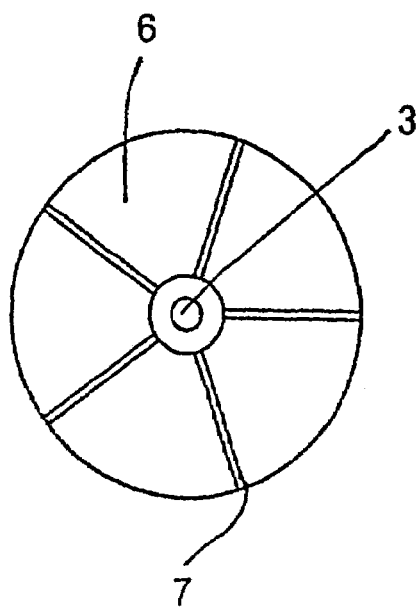
Figure 7:
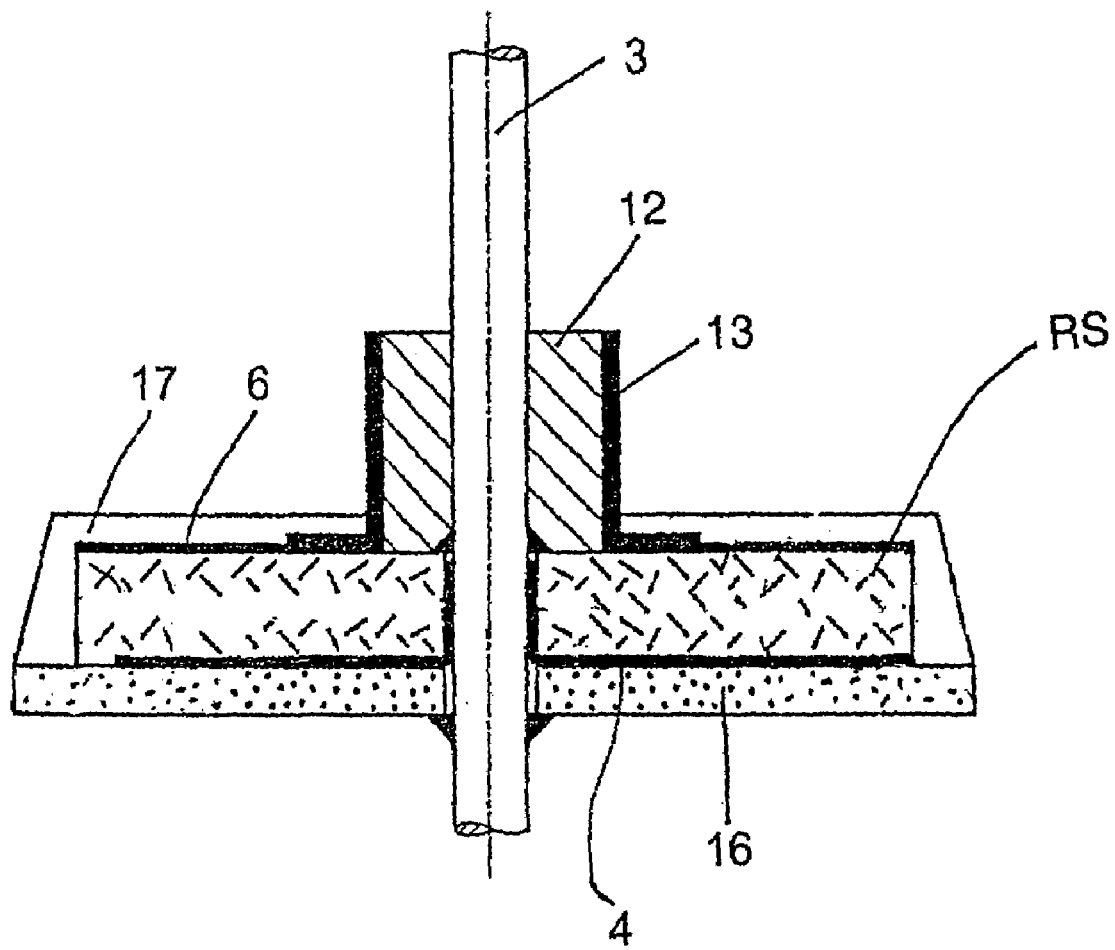
Figure 8:
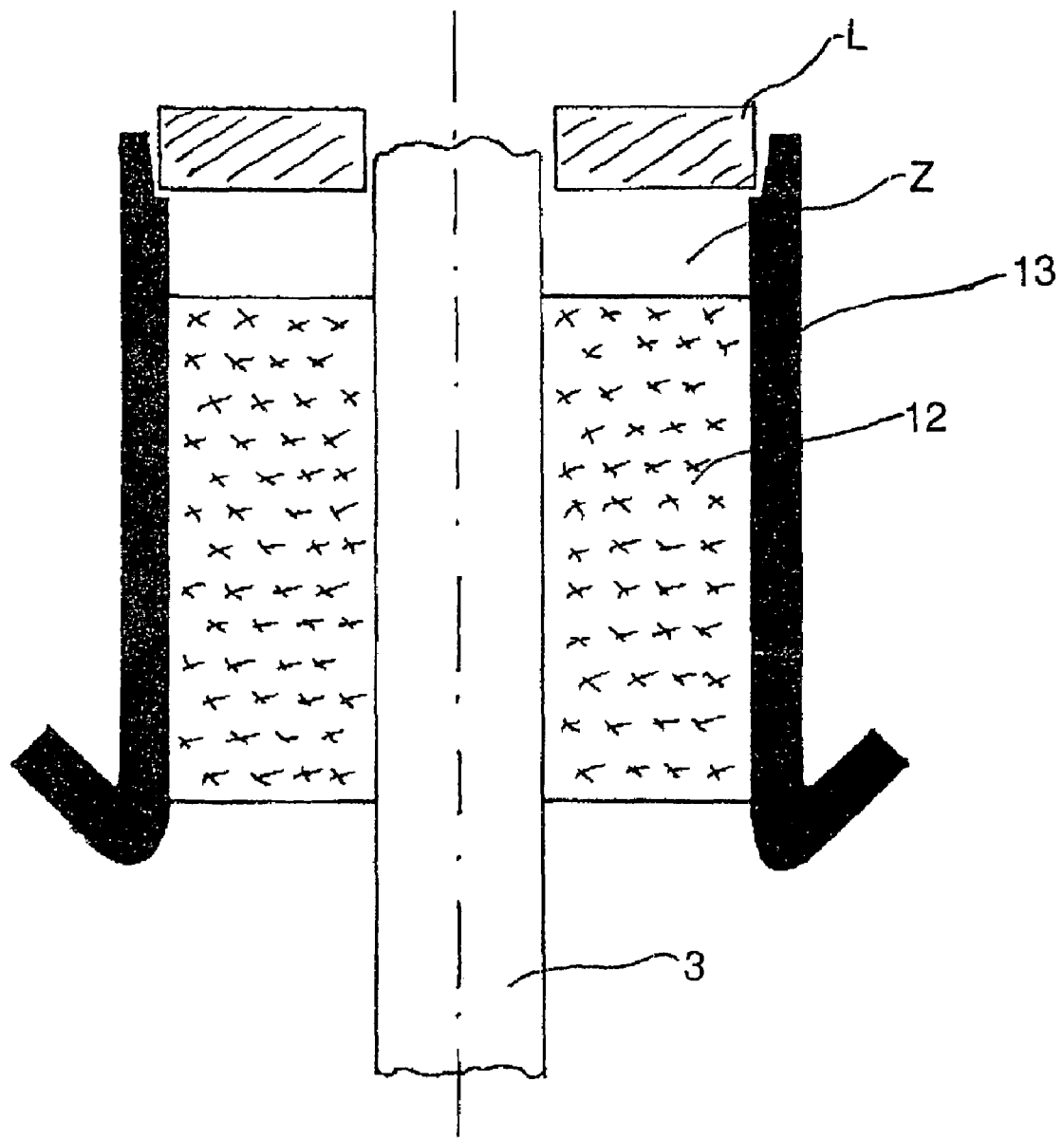

Examples will now be used to describe the invention in more detail based on the drawings. The figures are listed below:

FIG. 1 A schematic equivalent circuit diagram of a commutator in accordance with the state of technology, FIG. 2 A schematic equivalent circuit diagram of a first commutator arrangement provided by the invention, FIG. 3 A schematic equivalent circuit diagram of a second commutator arrangement provided by the invention, FIG. 4 A view of the top of a capacitor ring disk, FIG. 5 A schematic, partial cross-sectional view through a first commutator arrangement, FIGS. 6a, 6b A view of the bottom and top in accordance with FIG. 5, FIG. 7 A schematic cross-sectional view of a second commutator arrangement and FIG. 8 A schematic cross-sectional view of a second commutator arrangement.

FIG. 1 shows a equivalent circuit diagram of a conventional CLL disk. The capacitances or capacitor elements are designated as C and the ohmic resistance of the semi-conductive material is designated as $R_C$. A motor partial winding 1 has an electromagnetic capacitance $U_M$, a winding resistance $R_M$ and a motor inductivity $L_M$. The capacitor elements C are conductively connected via the n or p semi-conductive material located inside the CLL disk. The appropriate ring connection is designated with the reference designation 2. $U_N$ indicates a rated motor voltage, $U_L$ indicates a segment voltage and K indicates the contact points of the commutator segments with the partial windings and the contact surfaces. 3 indicates a shaft.

FIG. 2 shows the equivalent circuit diagram of an arrangement provided by the invention. Each of the contact points K of the commutator segments is connected with the capacitor elements C connected in parallel with the electrodes. The counter electrodes of the capacitor element C are connected with each other via common counter electrode layers 4. The counter electrode layers 4 can be electrically conductively connected via a bridge 5 with each other. The bridge 5 can be formed by the shaft 3.

Four capacitor elements C are connected here between two adjacent contact points K, wherein two capacitor elements C each are connected in parallel. The parallel connection of two capacitor elements C each can drastically increase the total capacitance between the two contact points K. With a parallel connection of capacitor elements C the total capacitance is the sum of the single capacitances. For example such a parallel connection can be implemented by stacking. When n capacitor ring disks are stacked, n capacitor elements C can be connected in parallel.

FIG. 3 shows a equivalent circuit diagram of a further arrangement provided by the invention. The components designated as A, B, C can be arranged in any order. "A" is an inductor, "B" is an ohmic resistance or a resistance without non linear U/I characteristic curve, and "C" is a capacitance. The suggested circuit, namely the provision of a capacitance C and an inductor A connected in series thereto between a commutator segment and a common ring connection which can be formed by the counter electrode layer 4, can also be the subject of a separate invention. With this circuit an advantageous arrangement consists of the provision of an additional resistance connected in series which can have a non linear U/I characteristic curve. With the used capacitances C this can be multi-layer capacitors in ring disk arrangement.

FIG. 4 shows a view of the top of an upper side of a first ring disk RS. The first ring disk is made of a dielectric ceramic material such as barium titanate. Reference designation 6 designates electrode layers shaped as sectors. These are the conductive pastes pressed onto the first ring disk RS and burned on. The electrode layers 6 are separated by electrically insulating strips 7. 8 designates the printed circuits which extend around the round recesses 9 provided along the exterior circumference of the first ring disk. When the first ring disks RS are stacked on top of each other the printed circuits 8 are used to contact the electrode layers 6. A central breakthrough 10 of the first ring disk RS has a diameter which is usefully not more than twice as large as the diameter of the shaft 3. It has been shown to be useful that the diameter of the breakthrough 10 is only slightly larger than the diameter of the shaft 3. It is also possible that the diameter of the breakthrough 10 is smaller than the diameter of the shaft 3. The ring disk RS can be mounted on the shaft 3 via gluing, pressing, clamping, shrinking on or soldering.

FIGS. 5, 6a and 6b show a laminate shaped from several first ring disks RS in the form of a multi-layer capacitor. For clarity's sake a supporting disk 11 is only suggested in the left half of the figure. The supporting disk 11 is installed here directly on the shaft 3. It is naturally also possible to arrange the supporting disk 7 differently, in particular to also secure it to a collector sleeve 12. With this first ring disks RS made of a dielectric material are stacked on top of each other. The dielectric material can be conventional materials suitable for making multi-layer capacitors. In this case $R_C$ can be specifically set if necessary by using electrodes with resistive characteristics (ohmic or voltage-dependent characteristic) for example. The same measure can also be used to establish a series resistance. Electrode layers 6 provided on the top of the first ring disks RS each extend up to the exterior circumference of the first ring disks RS. Counter electrode layers 4 provided on the bottom of the first ring disks RS do not extend to the exterior circumference of the first ring disks RS. In contrast they extend to the interior circumference of the first ring disks RS. The electrode layers 6 provided on the top of the first ring disks RS are shown schematically again in FIG. 6b. The electrode layers 6 are separated from each other via insulating strips 7 so that five separate electrode layers 6 are formed here.

The electrode layers 6 are electrically conductively connected with each other on the exterior circumference of the first ring disks RS via the printed circuits 8. The electrode layers 6 located on the uppermost top side of the first ring disks RS are electrically conductively connected with commutator segments 13 in a radial inner section.

The counter electrode layers 4 reach up to the interior circumference of the first ring disks RS and can be electrically conductively connected with each other via an inner contact 14 there. The inner contact 14 can in turn be electrically conductively connected with the shaft 3. The formation of the counter electrode layers 4 is shown in FIG. 6a. The counter electrode layers 4 are not segmented. They underlie almost the entire surface of the electrode layers 6 vis-à-vis. Thus all electrode layers 6 of a first ring disk RS have a single counter electrode layer 4.

The electrode layers 6 and the non segmented counter electrode layers 4 are each separated from each other in the laminate with an electrically insulating layer 15. This can be a dielectric capacitor mass. However a plastic membrane or similar can also be used as insulating layer 15.

With the suggested arrangement the resistance $R_C$ can be specifically set via the conductivity of the counter electrode layers 4. An electrode with a resistive characteristic (ohmic or voltage-dependent reaction) can be used to establish the counter electrode layers 4, wherein it is useful that $R_C$ is set in the range from 0.1 Ω to 1 kΩ.

Particularly the first ring disk RS suggested in the aforementioned example increases by many times the capacitances which can be achieved in comparison to the state of technology. For example if one establishes a multiple-layer capacitor from a dielectric mass such as X7R, Y5V, Z5U, COG, NPO and similar on a high-strength ceramic supporting disk 11 which can consist of $CeO_2$-stabilizing $ZrO_2$ or similar with a thickness of 0.4 mm, and if one assumes a thickness of 20 μm for the capacitor ring disk created from the first ring disk RS with electrode layers 6 and counter electrode layers 4 applied to this, whereby an electric strength of several 100 V is reliably ensured, this results in a surface of 9×15 mm$^2$ of the electrode layers 6 using an exterior circumference of the first ring disk RS of e.g. 16 mm and an interior diameter of the breakthrough 10 of 3.5 mm and with nine partial windings of a small electric motor. Considering a width of the insulating strip 7 of 1.0 mm between the electrode layers 6, the power matrix shown in the following table results. In the specified case the relative dielectricity constant is $\epsilon_r$= 4500 for the X7R dielectric, and $\epsilon_r$=7500 for the Y5V dielectric.

| Number of Layers | Resulting Thickness | X7R | Y5V |
| --- | --- | --- | --- |
| 1 | 0.42 mm | 9 × 30 nF | 9 × 45 nF |
| 10 | 0.60 mm | 9 × 300 nF | 9 × 450 nF |
| 20 | 0.80 mm | 9 × 600 nF | 9 × 900 nF |
| 30 | 1.00 mm | 9 × 900 nF | 9 × 1350 nF |
| 55 | 1.50 mm | 9 × 1650 nF | 9 × 2475 nF |
| 80 | 2.00 mm | 9 × 2400 nF | 9 × 3600 nF |
| 20 | 0.80 mm | 9 × 600 nF | 9 × 900 nF |
| 30 | 1.00 mm | 9 × 900 nF | 9 × 1350 nF |
| 55 | 1.50 mm | 9 × 1650 nF | 9 × 2475 nF |
| 80 | 2.00 mm | 9 × 2400 nF | 9 × 3600 nF |

As the table shows, a capacitance of 9×2400 nF or 9×3600 nF can be achieved with a first ring disk RS with a thickness of 2.0 thickness. In all probability such large capacitances are not needed for small electric motors. However the example shows that in principle all desired capacitances in the range of small electric motors can be generated with the first ring disk RS. This permits a significant reduction of the electromagnetic emissions and an increased lifespan of small electric motors to be expected. With the high capacitances which can be implemented by the invention a particularly high reduction of the electromagnetic emissions can be achieved since the resonance range of the oscillator circuit formed from the motor partial winding and the capacitance can be shifted to the frequency range of 150 kHz to 150 MHz.

With the commutator arrangement shown schematically in the cross-section in FIG. 7 a varistor ring disk 16 underlies the first ring disk RS. The varistor ring disk 16 is electrically conductively connected to the capacitor ring disk via the counter electrode layer 4. 17 designates an insulation layer covering the stack-shaped ring disk arrangement which layer can be made for instance of a lacquer, a glass paste or similar. Also in this case the ring disk arrangement is secured directly to the shaft 3 via soldering, gluing, shrinking on or similar. The electrode layers 6 provided on the upper side of the ring disk RS are in turn electrically conductively connected to the commutator segments 13 installed on the commutator sleeve 12.

FIG. 8 shows a cross-sectional view of a third commutator arrangement. With this the commutator sleeve 12, preferably made of plastic, is secured to the shaft 3. The commutator segments 13 are installed on the exterior circumference of the commutator sleeve 12. The commutator segments 13 have a hook-like bend on one end for the insertion of a wire of the motor winding (not shown here). On the other end the commutator segments 13 protrude over the end of the commutator sleeve 12. A laminate designated with the reference designation L which can for example be made from several capacitor ring disks and if necessary in connection with a varistor and/or resistance and/or inductor ring disk is permanently connected with the other end of the commutator segments 13 with a solder for example. An intermediate space Z remains between the laminate L and the commutator sleeve 12. The laminate L is not connected here with the shaft 3. A slight distance remains between the interior circumference of the laminate L and the shaft 3. The suggested commutator arrangement is particularly space-saving. In addition it permits a compensation of the differences in expansion coefficients caused by the different materials. The laminate L has both axial and radial freedom of movement. Even with higher operating temperatures the connection provided along the interior circumference of the commutator segments 13 with the laminate L is ensured. Naturally it can also be that the laminate L is held by contact springs (not shown here) which for example extend from the protruding ends of the commutator segments 13. Such contact springs can surround the laminate L up to its interior circumference.

In accordance with a particularly advantageous embodiment feature (not shown here) a layer made of a polymer can also be provided between the ring disks RS, 11, 16. This polymer layer serves to secure the ring disks RS, 11, 16 which are located one on top of the other. It gives the stack-shaped ring disk arrangement particularly great strength. When such a polymer intermediate layer which can be made from a two-sided membrane which can be glued for example is provided, the ring disk arrangement is usually secured by gluing it to the shaft 3. It is particularly inexpensive to connect a high-strength, ceramic, suitably coated supporting disk 11 on the breakthrough 10 with the shaft 3 by soldering. Several ring disks RS, 16 can be then be glued in stacked arrangement on the supporting disk 11. The ring disks RS, 16 are contacted along their exterior circumference with conductive adhesive or conductive lacquer. The arrangement is then covered with an insulating lacquer.

The ring disks RS, 11 and 16 can be made by conventional methods such as membrane drawing, drying pressing, screen printing or wet-in-wet methods with a thickness of approximately 0.005 to 2.0 mm. A laminate consisting of several ring disks RS, 11, 16 stacked on top of each other can thus be made with a thickness of a total of approximately 0.5 to 2.0 mm. The laminate is very strong. Provision of a special supporting ring disk 11 is not absolutely necessary. The laminate can be connected directly with the shaft 3 via soldering or gluing. High capacitances and further features which lengthen the lifespan of a commutator system can be implemented with the laminate provided by the invention.

REFERENCE DESIGNATION LIST

1 Motor partial winding
2 Ring connection
3 Shaft
4 Counter electrode layer
5 Bridge
6 Electrode layer
7 Insulating strips
8 Printed circuit
9 Recess
10 Breakthrough
11 Supporting disk
12 Commutator sleeve
13 Commutator segment
14 Interior contacting
15 Insulating layer
16 Varistor ring disk
17 Insulation layer
A, B, C Component
C Capacitance
$R_C$ Series resistance of the capacitance
$U_M$ Electromagnetic capacitance
$L_M$ Motor inductor
$U_L$ Segment voltage
K Contact points
RS First ring disk
$R_M$ Winding resistance
$U_N$ Rated motor voltage
L Laminate
Z Intermediate space

What is claimed is:

1. A commutator arrangement for a small electric motor, comprising:
   a capacitor ring disk consisting of several capacitor elements, said capacitor ring disk comprising a dielectric first ring disk (RS) on whose upper side several sector-shaped electrode layers (6) are positioned, each of the electrode layers (6) being electrically conductively connected with a commutator segment (13), and wherein counter electrodes of the capacitor elements are provided on an underside of the ring disk (RS), which is located opposite the upper side of the ring disk (RS),
   wherein a single underlying counter electrode layer (4) is provided, said counter electrode layer (4) underlies and almost covers the electrode layers (6) so that the counter electrodes of all capacitor elements have the same potential.

2. The commutator arrangement as defined in claim 1, wherein a plurality of capacitor ring disks are laminated on top of one another with a dielectric layer (15) disposed between adjacent capacitor ring disks.

3. The commutator arrangement as defined in claim 2, wherein the capacitor ring disks are laminated one on top of the other so that the electrode layers (6) are essentially located congruently over each other.

4. The commutator arrangement as defined in claim 2, wherein the capacitor elements created by the electrode layers (6) stacked on top of each other are contacted together to create a capacitive element and are each connected with a commutator segment (13).

5. The commutator arrangement as defined in claim 2, wherein the electrode layers (6) placed on top of one another are contacted with each other on an exterior circumferential surface of the first ring disk (RS).

6. The commutator arrangement as defined in claim 1, wherein the counter electrode layer (4) is round and extends up to an interior circumference of the first ring disk (RS).

7. The commutator arrangement as defined in claim 1, wherein the counter electrode layer (4) is formed as resistance layer with a resistance in the range from 0.1 Ω to 1 KΩ.

8. The commutator arrangement as defined in claim 1, wherein at least one inductor is connected before or after each capacitor element in series.

9. The commutator arrangement as defined in claim 1, wherein at least one discrete inductor is connected before or after each capacitor element in series.

10. The commutator arrangement as defined in claim 1, further comprising a second ring disk made of a highly permeable magnet material, said second ring disk being provided for which each of the inductors is formed by a conductive structure placed thereon, and wherein each of the capacitances is electrically conductively connected with one of the inductors.

11. The commutator arrangement as defined in claim 1, wherein at least one resistance is connected before or after each capacitor element in series.

12. The commutator arrangement as defined in claim 11, wherein the resistance has a non linear U/I characteristic curve.

13. The commutator arrangement as defined in claim 11, wherein the resistances are designed in one piece in the form of a third ring disk or as a further resistance layer placed on a ring disk or on the electrode layer (6) or the counter electrode layer (4).

14. The commutator arrangement as defined in claim 11, wherein a second and/or a third ring disk (16) or resistance layer form a laminate (L) with the capacitor ring disk(s).

15. The commutator arrangement as defined in claim 14, wherein a supporting disk (11) made of ceramic is provided for the retention of the capacitor or the laminate (L).

16. The commutator arrangement as defined in claim 14, wherein the capacitor ring disk(s) or the laminate (L) are connected with a commutator sleeve (12) supporting the commutator segments (13).

17. The commutator arrangement as defined in claim 14, wherein the capacitor ring disks or the laminate (L) is surrounded by the commutator segments (13).

18. A small electric motor with a shaft and a commutator arrangement mounted thereon as defined in claim 1.

* * * * *